US005955565A

United States Patent [19]
Morris et al.

[11] Patent Number: 5,955,565
[45] Date of Patent: Sep. 21, 1999

[54] POLYESTERS FROM TEREPHTHALIC ACID, 2,2,4,4-TETRAMETHYL-1,3-CYCLOBUTANEDIOL AND ETHYLENE GLYCOL

[75] Inventors: John C. Morris; James R. Bradley, both of Kingsport, Tenn.

[73] Assignee: Eastman Chemical Company, Kingsport, Tenn.

[21] Appl. No.: 08/996,596

[22] Filed: Dec. 23, 1997

Related U.S. Application Data

[60] Provisional application No. 60/034,155, Dec. 28, 1996.

[51] Int. Cl.⁶ .................................................. C08G 63/00
[52] U.S. Cl. .......................... 528/271; 528/176; 528/272; 528/302
[58] Field of Search ..................................... 528/271, 272, 528/176, 302

[56] References Cited

U.S. PATENT DOCUMENTS

| | | | |
|---|---|---|---|
| 2,210,817 | 8/1940 | Peterson | 528/196 |
| 2,787,632 | 4/1957 | Stevens | 528/196 |
| 2,789,968 | 4/1957 | Reynolds et al. | 528/196 |
| 3,022,272 | 2/1962 | Schnell et al. | 528/196 |
| 3,030,335 | 4/1962 | Goldberg | 528/176 |
| 3,313,777 | 4/1967 | Elam et al. | 528/196 |
| 3,317,466 | 5/1967 | Caldwell et al. | 528/196 |
| 3,335,111 | 8/1967 | Pray et al. | 528/176 |
| 3,772,405 | 11/1973 | Hamb | 528/196 |
| 4,182,726 | 1/1980 | Illuminati et al. | 528/271 |
| 4,263,364 | 4/1981 | Seymour et al. | 528/295 |
| 4,350,805 | 9/1982 | Jackson, Jr. et al. | 528/371 |
| 4,585,854 | 4/1986 | Tung et al. | 528/295 |
| 5,171,830 | 12/1992 | Grey | 528/371 |
| 5,506,014 | 4/1996 | Minnick | 428/35.7 |
| 5,646,237 | 7/1997 | George et al. | 528/295 |

FOREIGN PATENT DOCUMENTS

| | | |
|---|---|---|
| 63-92644 | 4/1988 | Japan . |
| 64-1724 | 1/1989 | Japan . |

OTHER PUBLICATIONS

Caldwell et al., Defensive Publication T858,012, 858 O.G. 43, Jan. 7, 1969.
Gilkey et al., Defense Publication T873,016, 873 O.G. 1033, Apr. 28, 1970.
Coover et al., Defensive Publication T875,010, 875 O.G. 342, Jun. 9, 1970.
Haggin, "Catalytic Cosynthesis Method Developed," Chemical and Engineering News, pp. 25–26, May 4, 1992.
Gawlak et al., "Polycarbonates from the 2,2,4,4,–tetramethylcyclobutane–1,3–Diols," Chemistry And Industry, pp. 1148–1149, Jun. 23, 1962.
Schnell "Chemistry And Physics of Polycarbonates, Polymer Reviews," vol. 9, Interscience Publishers (Germany), pp. 9–24, 1964.

*Primary Examiner*—Terressa Mosley
*Attorney, Agent, or Firm*—Betty J. Boshears; Harry J. Gwinnell

[57] ABSTRACT

The invention relates to a copolyester containing (a) a dicarboxylic acid component having from about 80 to 100 mole % terephthalic acid or the ester thereof; less than or equal to 20 mole % of an aromatic dicarboxylic acid having up to 20 carbon atoms or the ester thereof; and less than or equal to 10 mole % of an aliphatic dicarboxylic acid or an ester thereof having up to 16 carbon atoms; and (b) a glycol component having from about 25 to 85 mole % 2,2,4,4-tetramethyl-1,3-cyclobutanediol, from about 15 to 75 mole % ethylene glycol; and less than or equal to 10 mole % of a diol having 3 to 16 carbon atoms, wherein the total mole % of the dicarboxylic acid component is 100 mole % and the total mole % of the glycol component is 100 mole %. The invention further relates to a process for preparing the above-identified copolyester. The invention further relates to a blend having from about 5 to 95 wt % of the above-identified copolyester; and from 5 to 95 wt % of a component comprising a flame retardant, a filler, a reinforcing agent, a polymer or a mixture thereof. The invention further relates to an article prepared from the above-identified copolyester and blend.

51 Claims, No Drawings

POLYESTERS FROM TEREPHTHALIC ACID, 2,2,4,4-TETRAMETHYL-1,3-CYCLOBUTANEDIOL AND ETHYLENE GLYCOL

CROSS REFERENCE TO RELATED APPLICATIONS

This application claims priority upon U.S. provisional application Ser. No. 60/034,155, filed Dec. 28, 1996, the contents of which are herein incorporated in their entirety by this reference.

FIELD OF THE INVENTION

The present invention relates to copolyesters from terephthalic acid, 2,2,4,4-tetramethyl-1,3,cyclobutanediol and ethylene glycol that have a surprising combination of high impact strength, high hardness and high heat resistance.

BACKGROUND OF THE INVENTION

There currently exists in the vast field of performance plastics a need for a low cost polyester material which can be easily molded or otherwise formed into various articles requiring a superior combination of high impact strength, high hardness, and high heat resistance. These properties would be especially desirable in melt processable polyesters used for injection molded plastics, fibers, film and sheeting.

The performance plastics utilized in industry generally have 1) high impact strength with a notched Izod strength of at least 1 ft-lb/in (53.4 J/m), according to ASTM D256; 2) high hardness, such as a material having a Rockwell L hardness of at least 70, according to ASTM D785; and 3) high heat resistance, such as a material having a heat deflection temperature of at least 70° C. at 264 psi (18.6 Kg-force/cm$^2$) loading, according to ASTM D648. These industry standards, herein, are used to define the terms "high impact strength," "high hardness," and "high heat resistance." There are no known copolyesters having a combination of all three of high impact strength, high hardness and high heat resistance.

Commonly used melt processable polyesters in the performance plastics industry are copolymers made from terephthalic acid, 1,4-cyclohexanedimethanol, and ethylene glycol. These copolymers have been the best available melt processable polyesters for most uses due to the fact that they provide for good machinability during processing, provide high impact strength and have relatively low cost. However, these currently used copolyesters are often deficient in that they suffer from low heat resistance and only moderate hardness.

Many articles which are currently formed from copolyesters from terephthalic acid, 1,4-cyclohexanedimethanol and ethylene glycol, referred to hereinafter as the "PET/CHDML copolyester" for convenience, would greatly benefit from increased hardness and/or heat resistance. Examples of articles formed from PET/CHDML copolyesters having hardness and heat resistance include molded polyester exterior panels used in automobiles and farming equipment, small molded polyester appliance parts, and exterior and interior glazing sheets used to replace windows and glass.

It is generally known in the polyester industry that the glycol component of the PET/CHDML copolyester must contain a substantial amount of 1,4-cyclohexanedimethanol to provide high impact strength.

Ethylene glycol is the main diol modifier in the known PET/CHDML copolyesters. The glycol component of PET/CHDML copolyesters is modified with ethylene glycol in order to strike a balance between the stiffness of polyethylene terephthalate (PET) homopolyesters and the toughness of 1,4-cyclohexanedimethanol polyesters. It is known that increasing the mole percentage of ethylene glycol present in PET/CHDML copolyesters increases the hardness and decreases impact strength. However, high hardness, as defined in this application, can still not be achieved in this system.

Existing copolyesters having high hardness levels and high heat resistance tend to be prepared from all-aromatic components. The rigidity and relatively high glass transition temperatures, $T_g$, of the aromatic constituents provide for more hardness and heat resistance. However, those same properties also tend to make the copolyesters more brittle, providing insufficient impact strength.

Copolyesters based on terephthalic acid and 2,2,4,4-tetramethyl-1,3-cyclobutanediol having high impact strength are disclosed in U.S. Pat. No. 3,313,777. This patent discloses polyesters based on 2,2,4,4-tetraalkyl-1,3-cyclobutanediols which have resistance to oxidative and hydrolytic degradation and provide a copolyester having superior weathering characteristics and moisture resistance.

In light of the above, it would be very desirable in the performance plastics industry to have an economical copolyester having excellent machinability and a superior combination of high hardness, high heat resistance, and high impact strength.

SUMMARY OF THE INVENTION

In accordance with the purpose(s) of this invention, as embodied and broadly described herein, this invention, in one aspect, relates to a copolyester comprising:
  (a) a dicarboxylic acid component, comprising:
     i) from about 80 to 100 mole % terephthalic acid or the ester thereof;
     ii) less than or equal to 20 mole % of an aromatic dicarboxylic acid having up to 20 carbon atoms or the ester thereof; and
     iii) less than or equal to 10 mole % of an aliphatic dicarboxylic acid or an ester thereof having up to 16 carbon atoms; and
  (b) a glycol component comprising:
     iv) from about 25 to 85 mole % 2,2,4,4-tetramethyl-1, 3-cyclobutanediol;
     v) from about 15 to 75 mole % ethylene glycol; and
     vi) less than or equal to 10 mole % of a diol having 3 to 16 carbon atoms,
  wherein the total mole % of the dicarboxylic acid component is 100 mole % and the total mole % of the glycol component is 100 mole %.

The invention further relates to a process for producing a copolyester, comprising:
  (1) heating a mixture, comprising:
     (a) a dicarboxylic acid component, comprising:
        i) from about 80 to 100 mole % terephthalic acid or the ester thereof;
        ii) less than or equal to 20 mole % of an aromatic dicarboxylic acid having up to 20 carbon atoms or the ester thereof; and
        iii) less than or equal to 10 mole % of an aliphatic dicarboxylic acid or an ester thereof having up to 16 carbon atoms; and
     (b) a glycol component comprising:
        iv) from about 25 to 85 mole % 2,2,4,4-tetramethyl-1,3-cyclobutanediol;

v) from about 15 to 75 mole % ethylene glycol; and
vi) less than or equal to 10 mole % of a diol having 3 to 16 carbon atoms,
wherein the total mole % of the dicarboxylic acid component is 100 mole % and the total mole % of the glycol component is 100 mole %, in the presence of a catalyst at a temperature of about 150° C. to 220° C. for a time sufficient to produce an initial copolyester; and (2) further heating the initial polyester of step (1) at about 220 to 320° C. for about 1 to 2 hours.

The invention further relates to a product made by the process described above.

The invention further relates to a polymer blend, comprising:
i) from about 5 to 95 wt % of the copolyester described above; and
ii) from about 5 to 95 wt % of a component comprising a flame retardant, a filler, a reinforcing agent or a polymer.

The invention further relates to an article of manufacture comprising an article made from the copolyester described above.

The invention further relates to an article of manufacture comprising an article made from the blend described above.

The invention further relates to a copolyester comprising:
(a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
(b) a glycol component comprising about 25 to 85 mol % 2,2,4,4-tetramethyl-1,3-cyclobutanediol, about 15 to 75 mol % ethylene glycol, and about 0 to 10 mol % of other glycols having 3 to 16 carbon atoms,
wherein the total mol % of the dicarboxylic acid component is 100 mol % and the total mol % of the glycol component is 100 mol %, further wherein the heat deflection temperature is at least 70° C. at 264 psi (18.6 Kg-force/cm$^2$) loading, determined according to ASTM D648.

The invention further relates to a process for producing a copolyester comprising;
(1) heating the following mixture in the presence of a catalyst at a temperature of about 150° C. to 220° C. for a time sufficient to react a significant portion of the distillable ethylene glycol,
(a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
(b) a glycol component comprising about 25 to 85 mol % 2,2,4,4-tetramethyl-1,3-cyclobutanediol, about 15 to 75 mol % ethylene glycol, and about 0 to 10 mol % other glycols having 3 to 16 carbon atoms,
wherein the total mol % of the dicarboxylic acid component is 100 mol % and the total mol % of the glycol component is 100 mol %; and
(2) further heating the mixture of step (1) at about 220 to 320° C. for about 1 to 2 hours; and
(3) thereafter, removing any unreacted glycols.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

In accordance with the purpose(s) of this invention, as embodied and broadly described herein, this invention, in one aspect, relates to a copolyester comprising:
(a) a dicarboxylic acid component, comprising:
i) from about 80 to 100 mole % terephthalic acid or the ester thereof;
ii) less than or equal to 20 mole % of an aromatic dicarboxylic acid having up to 20 carbon atoms or the ester thereof; and
iii) less than or equal to 10 mole % of an aliphatic dicarboxylic acid or an ester thereof having up to 16 carbon atoms; and
(b) a glycol component comprising:
iv) from about 25 to 85 mole % 2,2,4,4-tetramethyl-1, 3-cyclobutanediol;
v) from about 15 to 75 mole % ethylene glycol; and
vi) less than or equal to 10 mole % of a diol having 3 to 16 carbon atoms,
wherein the total mole % of the dicarboxylic acid component is 100 mole % and the total mole % of the glycol component is 100 mole %.

The invention further relates to a copolyester comprising:
(a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
(b) a glycol component comprising about 25 to 85 mol % 2,2,4,4-tetramethyl-1,3-cyclobutanediol, about 15 to 75 mol % ethylene glycol, and about 0 to 10 mol % of other glycols having 3 to 16 carbon atoms,
wherein the total mol % of the dicarboxylic acid component is 100 mol % and the total mol % of the glycol component is 100 mol %, further wherein the heat deflection temperature is at least 70° C. at 264 psi (18.6 Kg-force/cm²) loading, determined according to ASTM D648.

The applicants have unexpectedly discovered a copolyester that has a combination of high hardness, high heat resistance and high impact strength. This superior combination of performance properties is due to the particular amounts of terephthalic acid, 2,2,4,4-tetramethyl-1,3-cyclobutanediol (cis, trans, or mixtures thereof), and ethylene glycol which constitute the copolyester.

Based on previous knowledge of copolyesters, the applicants unexpectedly discovered that a copolyester made from terephthalic acid and particular amounts of 2,2,4,4-tetramethyl-1,3-cyclobutanediol and ethylene glycol, both diols being highly rigid and having high glass transition temperatures, has high impact strength.

The applicants expected that the properties of a copolyester from terephthalic acid and 2,2,4,4-tetramethyl-1,3-cyclobutanediol would exhibit a somewhat similar trend as is observed in the properties of PET/CHDML copolyesters, as relates to increasing mole percentages of the rigid ethylene glycol.

As shown in Table 2 of the Examples, increasing the amount of ethylene glycol in PET/CHDML copolyesters generally decreases impact strength and increases hardness. The applicants were surprised to find that increasing the mole percentage of ethylene glycol in a copolyester significantly lowers the hardness and heat resistance of the copolyester while generally decreasing impact strength. This is especially surprising since 2,2,4,4-tetramethyl-1,3-cyclobutanediol is a compound which is much more rigid and has a much higher glass transition temperature than does 1,4-cyclohexanedimethanol, and would be expected to combine with rigid ethylene glycol monomers to provide copolyesters having increasingly more rigidity, hardness and brittleness than PET/CHDML copolyesters.

The applicants also discovered the surprising result that copolyesters produced from particular amounts of terephthalic acid, 2,2,4,4-tetramethyl-1,3-cyclobutanediol and ethylene glycol have an advantageously superior combination of impact strength, hardness, and heat resistance than has never been possible with PET/CHDML copolyesters or other polyesters.

The present invention is a copolyester of terephthalic acid, 2,2,4,4-tetramethyl-1,3-cyclobutanediol, ethylene glycol and other optional modifying dicarboxylic acids and diols. "Copolyester" is defined herein as a polyester having three or more polyester monomers, wherein the monomer can be a dicarboxylic acid and a diol.

The dicarboxylic acid component of the present invention is predominately terephthalic acid (at least 80 mole %). Terephthalic acid is beneficial due to its rigidity from the aromatic ring and its straightness due to the para substituted carbonyls. Other similar para substituted aromatic dicarboxylic acids may be used in the invention but are not generally as economical to use as terephthalic acid.

Terephthalic acid or an ester thereof makes up the dicarboxylic acid component of the present copolyester at a concentration of at least about 80 mole %, preferably at least 90 mole %, with a mole % of about 100 being most preferred. About 80 mole % terephthalic acid is required in order to maintain high impact strength and good extrudability, injectability and otherwise general performance plastics machinability. Higher amounts of terephthalic acid are preferred in order to produce a higher impact strength copolyester.

In addition to terephthalic acid, the dicarboxylic acid component can have up to 20 mole % of another modifying aromatic dicarboxylic acid but preferably less than 10 mole % with a mole % of 0 being most preferred. Modifying aromatic dicarboxylic acids which may be used in the present invention are those having up to about 20 carbon atoms, and which are linear, para-oriented, or symmetrical. Examples of modifying aromatic dicarboxylic acids which may be used in this invention include isophthalic acid, 4,4'-biphenyldicarboxylic acid, 1,4-, 1,5-, 2,6-, 2,7-naphthalenedicarboxylic acid and trans-4,4'-stilbenedicarboxylic acid, and the esters thereof.

The carboxylic acid component of the copolyesters of our invention can be further modified with up to 10 mole % of an aliphatic dicarboxylic acid containing 2–16 carbon atoms, such as malonic, succinic, glutaric, adipic, pimelic, suberic, azelaic and dodecanedioic dicarboxylic acids. The presence of more than 10 mole % of aliphatic dicarboxylic acids is not preferred because it would substantially decrease the hardness and heat resistance of the copolyester.

Esters of terephthalic acid and the other modifying dicarboxylic acids may be used instead of the dicarboxylic acids. Suitable examples of dicarboxylic acid esters include the dimethyl, dipropyl, diisopropyl, dibutyl, diphenyl esters. The methyl, propyl, isopropyl, and phenyl esters are most preferred.

The glycol component of the present invention contains about 25 to 85 mole % 2,2,4,4-tetramethyl-1,3-cyclobutanediol. The 2,2,4,4-tetramethyl-1,3-cyclobutanediol may be cis, trans, or a mixture thereof, preferably about 45 to 55 mole % trans isomers out of total cis and trans isomers. 2,2,4,4-Tetramethyl-1,3-cyclobutanediol is especially useful in providing hardness and heat resistance to the present copolyester due to its very high glass transition temperature of about 200° C. 2,2,4,4-Tetramethyl-1,3-cyclobutanediol is also relatively economical and has the good weatherability characteristics of 2,2,4,4-tetraalkyl-1,3-cyclobutanediols.

In a preferred embodiment, the amount of 2,2,4,4-tetramethyl-1,3-cyclobutanediol is from 30 to 85 mole %, more preferably from 30 to 70 mole %, with a mole % of from 50 to 70 being most preferred, based on the mole % of the glycol component. Copolyesters containing less than about 25 mole % 2,2,4,4-tetramethyl-1,3-cyclobutanediol tend to have only low to moderate hardness and heat resistance and unacceptable impact strength. However, copolyesters containing more than 85 mole % 2,2,4,4-tetramethyl-1,3-cyclobutanediol have excessively high inherent viscosities which make the copolyesters difficult to mold or process without excessive thermal degradation.

The glycol component of the present copolyester also contains about 15 to 75 mole % ethylene glycol. The preferred amount of ethylene glycol in the copolyester is about 15 to 70 mole %, more preferably 30 to 70 mole %, with 30 to 50 mole % being most preferred. Terephthalic acid/2,2,4,4-tetramethyl-1,3-cyclobutanediol copolyesters having less than about 15 mole % ethylene glycol do not have adequate hardness or heat resistance. Copolyesters having more than 75 mole % ethylene glycol do not have an impact strength adequate for use in engineering plastic applications.

Additionally, the glycol component of the copolyesters of the invention can also be modified with 0 to about 10 mole % of other aliphatic diols having 3 to 16 carbon atoms, preferably less than 5 mole %. Different diols provide slightly modified characteristics to the copolyester such as improving dye receptivity or elasticity. The presence of much more than 10 mole % of the modifying diols is unsuitable because it would lower the glass transition temperature of the copolyester and reduce hardness and heat resistance. Examples of suitable modifying diols include, but are not limited to, 1,2-propanediol, 1,3-propanediol, neopentyl glycol, 1,5-pentanediol, 1,6-hexanediol, cis-1,4-cyclohexanedimethanol, trans-1,4-cyclohexane-dimethanol, p-xylene glycol, polyethylene glycols, polytetramethylene glycols, and mixtures thereof.

The present copolyesters have a superior combination of properties evidenced by a notched Izod strength of at least 1 ft-lb/in (53.4 J/m), a Rockwell hardness of at least 70 and a heat deflection temperature at 264 psi loading of at least 70° C.

The preferred copolyester of the present invention has a dicarboxylic acid component of about 100 mole % terephthalic acid and a glycol component of about 35 to 70 mole % 2,2,4,4-tetramethyl-1,3-cyclobutanediol, with the remaining glycol component being ethylene glycol (30 to 65 mole %). This preferred copolyester has a notched Izod strength of about 1.5 to 12.5 ft-lb/in, a Rockwell L hardness of about 84 to 95, and a heat deflection temperature at 264 psi loading of about 80 to 108° C.

An even more preferred copolyester of the present invention has a dicarboxylic acid component of about 100 mole % terephthalic acid and a glycol component of about 50 to 70 mole % 2,2,4,4-tetramethyl-1,3-cyclobutanediol, with the remaining glycol component being ethylene glycol (30 to 50 mole %). This more preferred copolyester has a notched Izod strength of about 2 to 12.5 ft-lb/in, a Rockwell L hardness of about 90 to 95, and a heat deflection temperature at 264 psi loading of about 90 to 108° C.

The most preferred copolyester of the present invention has a dicarboxylic acid component of about 100 mole % terephthalic acid and a glycol component of about 64 to 69 mole % 2,2,4,4-tetramethyl-1,3-cyclobutanediol, with the remaining glycol component being ethylene glycol (31 to 36 mole %). This most preferred copolyester has a notched Izod strength of about 11.4 to 12.5 ft-lb/in, a Rockwell L hardness of about 94 to 95, and a heat deflection temperature at 264 psi loading of about 102 to 108° C.

The invention further relates to a process for producing a copolyester, comprising:
(1) heating a mixture, comprising:
  (a) a dicarboxylic acid component, comprising:
    i) from about 80 to 100 mole % terephthalic acid or the ester thereof;
    ii) less than or equal to 20 mole % of an aromatic dicarboxylic acid having up to 20 carbon atoms or the ester thereof; and
    iii) less than or equal to 10 mole % of an aliphatic dicarboxylic acid or an ester thereof having up to 16 carbon atoms; and
  (b) a glycol component comprising:
    iv) from about 25 to 85 mole % 2,2,4,4-tetramethyl-1,3-cyclobutanediol;
    v) from about 15 to 75 mole % ethylene glycol; and
    vi) less than or equal to 10 mole % of a diol having 3 to 16 carbon atoms,
  wherein the total mole % of the dicarboxylic acid component is 100 mole % and the total mole % of the glycol component is 100 mole %,
  in the presence of a catalyst at a temperature of from about 150° C. to 220° C. for a time sufficient to produce an initial copolyester; and
(2) further heating the initial polyester of step (1) at about 220 to 320° C. for about 1 to 2 hours.

The invention further relates to a process for producing a copolyester comprising;

(1) heating the following mixture in the presence of a catalyst at a temperature of about 150° C. to 220° C. for a time sufficient to react a significant portion of the distillable ethylene glycol,
  (a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
  (b) a glycol component comprising about 25 to 85 mol % 2,2,4,4-tetramethyl-1,3-cyclobutanediol, about 15 to 75 mol % ethylene glycol, and about 0 to 10 mol % other glycols having 3 to 16 carbon atoms,
  wherein the total mol % of the dicarboxylic acid component is 100 mol % and the total mol % of the glycol component is 100 mol %; and
(2) further heating the mixture of step (1) at about 220 to 320° C. for about 1 to 2 hours; and
(3) thereafter, removing any unreacted glycols.

The invention further relates to a product made by the process described above.

The copolyester of the present invention is produced by heating a mixture of the compounds of the dicarboxylic acid component and the glycol component, as disclosed above, in the presence of a catalyst at a temperature of about 150 to 220° C. for a time sufficient to react a significant portion of the distillable ethylene glycol and then further heating the mixture at about 220 to 320° C. for about 1 to 2 hours. In one embodiment, the amount of ethylene glycol that is reacted at least 70%, preferably at least 80%, preferably at least 90%, and more preferably at least 95%. Afterwards, a vacuum can be applied to remove excess unreacted diols and by-products and raise the molecular weight of the copolyester.

Suitable catalysts for use in this process include the organic derivatives of zinc and tin. The use of this type of catalyst is well known in the art. Examples of catalyst useful in the present invention include, but are not limited to, zinc acetate, dibutyltin diacetate, or dibutyltin oxide.

The invention further relates to a polymer blend, comprising:
  i) from about 5 to 95 wt % of the copolyester described above; and
  ii) from 5 to 95 wt % of a component comprising a flame retardant, a filler, a reinforcing agent or a polymer.

The copolyester of the present invention can be blended with other components and formed into a blend composition comprising component (i), the present copolyester, in an amount of about 5 to 95 wt % and component (ii) present in the amount of 5 to 95 wt %. Suitable examples of component (ii) include, but are not limited to, NYLON 6,6® from DuPont; poly(ether-imides) such as ULTEM®, a poly (etherimide) from General Electric; polyphenylene oxides such as poly(2,6-dimethylphenylene oxide) or poly (phenylene oxide)/polystyrene blends such as the NORYL 1000®, a blend of poly(2,6-dimethylphenylene oxide and polystyrene resins from General Electric; polyesters; polyphenylene sulfides; polyphenylene sulfide/sulfones; poly(ester-carbonates); polycarbonates, such as LEXAN®, a polycarbonate from General Electric; polysulfones; polysulfone ethers; and poly(ether-ketones) of aromatic dihydroxy compounds. The aromatic dihydroxy compounds used to prepare these polymers are disclosed in U.S. Pat. Nos. 3,030,335 and 3,317,466.

Component (ii) of the blend composition of this invention may also be a conventional flame retardant, such as a phosphorus compound, a halogen compound, or a halogen compound in combination with an antimony compound; a filler, such as talc or mica; a reinforcing agent, such as glass fiber or a poly(1,4-phenylene terephthalamide) such as KEVLAR® from DuPont; or carbon fiber.

The invention further relates to an article of manufacture comprising an article made from the copolyester and blend described above.

The present copolyester and/or polyester blend composition is anticipated to be most useful in forming fibers, films, molded articles, and sheeting. The methods of forming the copolyesters into fibers, films, molded articles and sheeting are well known in the art.

The following examples are put forth so as to provide those of ordinary skill in the art with a complete disclosure and description of how the compositions of matter and methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at room temperature and pressure is at or near atmospheric.

EXAMPLES

The inherent viscosity of the polyesters was determined in 60/40 (wt/wt) phenol/tetrachloroethane at a concentration of 0.5 g/100 ml at 25° C. The glass transition temperatures were determined using a TA 2100 from Thermal Analyst Instrument at a scan rate of 20° C./min. The glycol content of the compositions was determined by proton nuclear magnetic resonance spectroscopy (NMR).

The polymers were dried at from 80 to 100° C. in a vacuum oven for 24 hours and injection-molded on a Boy 22S molding machine to give ⅛×½×5-inch flexure bars. The notched Izod impact strength of these copolymers was determined according to the procedures of ASTM D256 using an average of five breaks. The Rockwell L hardness was determined following the procedure of ASTM D785. The heat deflection temperature at 264 psi (18.6 Kg-force/cm$^2$) loading was determined according to the procedure of ASTM D648.

Zinc acetate and dibutyltin oxide were used as esterification and polycondensation catalysts during the preparation of the copolyesters, and the amounts of these catalyst are specified below.

Example 1 (Comparative)

This example illustrates the preparation of a copolyester containing 100 mole % terephthalic acid, 13 mole % 2,2,4,4-tetramethyl-1,3-cyclobutanediol, and 87 mole % ethylene glycol units.

A mixture of 194.0 g (1.0 mol) dimethyl terephthalate, 111.6 g (1.8 mol) ethylene glycol, 28.8 g (0.20 mol) 2,2,4,4-tetramethyl-1,3-cyclobutanediol, 0.044 g zinc acetate (65 ppm), and 0.24 g dibutyltin diacetate (400 ppm) was placed in a one liter flask equipped with an inlet for nitrogen, a metal stirrer, and a short distillation column. The flask was placed in a Wood's metal bath already heated to 190° C. and the contents of the flask were heated at 190° C. for 3 hours, then at 210° C. for 1.5 hours, then at 260° C. for 30 minutes. A vacuum of 0.5 mm was gradually applied over the next 3 to 5 minutes and after 10 minutes the temperature was raised to 280° C. Full vacuum was maintained for a total time of about 45 minutes to remove excess unreacted diols. A high melt viscosity, amber polymer was obtained with a glass transition temperature of 89° C. and an inherent viscosity of 0.76. The polymer was ground to pass a 3-mm screen, dried and injection-molded to give flexure bars having a notched Izod impact strength of 0.77 ft-lb/in (41.1 J/m), a Rockwell L Hardness of 70, and a heat deflection temperature of 66° C.

The results of this analysis are shown on Table 1. This comparative example illustrates that a copolyester prepared from terephthalic acid, 2,2,4,4-tetramethyl-1,3-cyclobutanediol and ethylene glycol outside of the particular concentrations of the present invention does not have the superior combination of high impact strength, high hardness and high heat resistance of the invention.

Example 2

This example illustrates the preparation of the copolyester containing 100 mole % terephthalic acid, 64 mole % 2,2,4,4-tetramethyl-1,3-cyclobutanediol, and 36 mole % ethylene glycol units.

A mixture of 194.0 g (1.0 mol) dimethyl terephthalate, 132.5 g (0.92 mol) 2,2,4,4-tetramethyl-1,3-cyclobutanediol, and 67.0 g (1.08 mol) ethylene glycol, 0.054 g zinc acetate (65 ppm), and 0.21 g dibutyltin oxide (400 ppm) was placed in a one liter flask equipped with an inlet for nitrogen, a metal stirrer, and a short distillation column. The flask was placed in a Wood's metal bath already heated to 190° C. for 2.5 hours, then at 220° C. for 1 hour, then at 240° C. for 30 minutes and at 260° C. for 20 minutes. A vacuum of 0.5 mm was gradually applied over the next 3 to 5 minutes and after 20 minutes the temperature was raised to 280° C. for 35 minutes. Full vacuum was maintained for a total time of about 55 minutes. A high melt viscosity, amber polymer was obtained with a glass transition temperature of 141° C. and an inherent viscosity of 0.64.

The polymer was ground to pass a 3-mm screen, dried and injection-molded to give bars having a notched Izod impact strength of 12.40 ft-lb/in (662.2 J/m), a Rockwell L Hardness of 94, and a heat deflection temperature of 102° C.

The results of this polyester are shown in Table 1. This example illustrates the most preferred embodiment of the present invention wherein the impact strength of the copolyester was very high and the hardness and heat resistance were both exceptionally high.

Example 3

This example further illustrates the present invention with nine different copolyesters of 100 mole % terephthalic acid, and different amounts of 2,2,4,4-tetramethyl-1,3-cyclobutanediol (TMCD), and ethylene glycol. The properties of these copolyesters are shown in Table 1. The other polyesters were prepared in a manner similar to Examples 1 and 2 above.

TABLE 1

Properties of Copolyesters of Terephthalic Acid (100 mole %), 2,2,4,4-Tetramethyl-1,3-Cyclobutanediol (TMCD), and Ethylene Glycol

| TMCD mole % | Ethylene Glycol mole % | Izod Impact Strength ft-lb/in (Joules/m) | Rockwell L Hardness | Heat Deflect. Temp. (° C.) |
|---|---|---|---|---|
| 0 | 100 | 0.66 (35.2) | 76 | 61 |
| 13 | 87 | 0.77 (41.1) | 76 | 66 |
| 34 | 66 | 1.57 (83.8) | 84 | 80 |

TABLE 1-continued

Properties of Copolyesters of Terephthalic Acid (100 mole %), 2,2,4,4-Tetramethyl-1,3-Cyclobutanediol (TMCD), and Ethylene Glycol

| TMCD mole % | Ethylene Glycol mole % | Izod Impact Strength ft-lb/in (Joules/m) | Rockwell L Hardness | Heat Deflect. Temp. (° C.) |
|---|---|---|---|---|
| 50 | 50 | 2.43 (129.8) | 90 | 90 |
| 56 | 64 | 7.42 (396.2) | 92 | 79 |
| 44 | 36 | 12.40 (662.2) | 94 | 102 |
| 69 | 31 | 11.45 (611.4) | 95 | 108 |
| 84 | 16 | 2.58 (137.8) | 103 | 118 |
| 100 | 0 | * | * | * |

*The polyester molded with extreme difficulty and degraded severely during processing.

Table 1 shows that copolyesters outside of the concentration range of the present invention (25 to 85 mole % 2,2,4,4-tetramethyl-1,3-cyclobutanediol and 15 to 75 mole % ethylene glycol) do not have the combination of high impact strength, high hardness and high heat resistance, as do the copolyesters of the present invention. Table 1 also illustrates the general affect that the amount of ethylene glycol has upon the three properties tested.

Example 4

This example illustrates the difference in copolyesters from terephthalic acid, 2,2,4,4-tetramethyl-1,3-cyclobutanediol, and ethylene glycol and copolymers of terephthalic acid, 1,4-cyclohexanedimethanol (CHDML), and ethylene glycol (PET/CHDML copolyesters). The PET/CHDML copolyesters were prepared essentially as were the copolymers of Example 3.

The concentrations used and property analyses of the PET/CHDML copolyesters prepared are shown in Table 2.

By comparing Tables 1 and 2, it is obvious that the copolyesters of the present invention have a superior combination of impact strength, hardness and heat resistance.

TABLE 2

Properties of Copolyesters of Terephthalic Acid (100 mole %), 1,4-Cyclohexanedimethanol, and Ethylene Glycol (the "PET/CHDML copolyester)

| CHDML mole % | Ethylene Glycol mole % | Izod Impact Strength ft-lb/in (Joules/m) | Rockwell L Hardness | Heat Deflect. Temp. (° C.) |
|---|---|---|---|---|
| 0 | 100 | 0.84 (44.9) | 81 | 62 |
| 16 | 84 | 1.03 (55.0) | 70 | 60 |
| 31 | 69 | 0.91 (48.6) | 63 | 64 |
| 44 | 56 | 1.70 (90.8) | 63 | 61 |
| 5o | 50 | 17.26 (921.7) | 62 | 66 |
| 59 | 41 | 28.68 (1531.5) | 59 | 64 |
| 77 | 23 | 28.88 (1542.2) | 56 | 64 |
| 77 | 23 | 29.59 (1580.1) | 56 | 67 |
| 83 | 17 | 21.91 (1170.0) | 56 | 65 |
| 100 | 0 | 18.74 (1000.7) | 57 | 67 |

Example 5

This example illustrates the superiority of the copolyesters of the present invention over some of the most widely used commercial copolyesters. Four commercial copolyesters commonly used in the performance plastics industry were tested for impact strength, hardness and heat resistance using the same test methods as were used for all of the examples above. The following commercial copolyesters were used:

PET 7352- A polyester manufactured by Eastman Chemical Company prepared from 100 mole % terephthalic acid and 100 mole % ethylene glycol;

2) PETG 6763- A polyester manufactured by Eastman Chemical Company from 100 mole % terephthalic acid, 69 mole % ethylene glycol, and 31 mole %, 1,4-cyclohexanedimethanol;

3) PCTG 5445- A polyester manufactured by Eastman Chemical Company prepared from 100 mole % terephthalic acid, 42 mole % ethylene glycol, and 58 mole % 1,4-cyclohexanedimethanol; and 4) PCT- A polyester manufactured by Eastman Chemical Company prepared from 100 mole % terephthalic acid and 100 mole % 1,4-cyclohexanedimethanol.

TABLE 3

Commercial Polyesters for Comparison

| Composition | Izod Impact Strength, ft-lb/in (Joules/m) | Rockwell L Hardness | Heat Deflection Temp. (° C.) |
|---|---|---|---|
| PET 7352 | 0.67 (35.8) | 80 | 63 |
| PETG 6763 | 1.57 (83.8) | 67 | 64 |
| PCTG 5445 | 28.70 (1532.6) | 60 | 67 |
| PCT | 22.90 (1222.9) | 71 | 60 |

It can be clearly seen from the comparison of Table 1 with Tables 2 and 3, that the copolyesters of the present invention offer a definite advantage over the commercial copolyesters available and other PET/CHDML copolyesters in their superior combination of high impact strength, high hardness and high heat resistance.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A copolyester comprising:
   (a) a dicarboxylic acid component, comprising:
      i) from about 80 to 100 mole % terephthalic acid or the ester thereof;
      ii) from about 0 to 20 mole % of an aromatic dicarboxylic acid having up to 20 carbon atoms or the ester thereof; and
      iii) less than or equal to 10 mole % of an aliphatic dicarboxylic acid or an ester thereof having up to 16 carbon atoms; and
   (b) a glycol component comprising:
      iv) from about 25 to 85 mole % 2,2,4,4-tetramethyl-1,3-cyclobutanediol;
      v) from about 15 to 75 mole % ethylene glycol; and
      vi) less than or equal to 10 mole % of a diol having 3 to 16 carbon atoms,
   wherein the total mole % of the dicarboxylic acid component is 100 mole % and the total mole % of the glycol component is 100 mole %.

2. The copolyester of claim 1, wherein the dicarboxylic acid component comprises from about 90 to 100 mole % terephthalic acid and less than or equal to 0 to 10 mole % of the aromatic dicarboxylic acid.

3. The copolyester of claim 1, wherein the dicarboxylic acid component is 100 mole % terephthalic acid.

4. The copolyester of claim 1, wherein the aromatic dicarboxylic acid comprises isophthalic acid, 4,4'-biphenyldicarboxylic acid, 1,5-naphthalenedicarboxylic acid, 2,6-naphthalenedicarboxylic acid, 2,7-naphthalenedicarboxylic acid, and trans-4,4'-stilbenedicarboxylic acid or a mixture thereof.

5. The copolyester of claim 1, wherein the ester of terephthalic acid, the aliphatic dicarboxylic acid, and the aromatic dicarboxylic acid comprises a dimethyl ester, a dipropyl ester, a diisopropyl ester, a dibutyl ester, or a diphenyl ester.

6. The copolyester of claim 1, wherein 2,2,4,4-tetramethyl-1,3-cyclobutanediol is cis, trans, or a mixture thereof.

7. The copolyester of claim 1, wherein the 2,2,4,4-tetramethyl-1,3-cyclobutanediol is from about 45 to 55 mole % trans-2,2,4,4-tetramethyl-1,3-cyclobutanediol and from about 45 to 55 mole % cis-2,2,4,4-tetramethyl-1,3-cyclobutanediol.

8. The copolyester of claim 1, wherein the diol comprises 1,2-propanediol, 1,3-propanediol, neopentyl glycol, 1,5-pentanediol, 1,6-hexanediol, cis-1,4-cyclohexane dimethanol, trans-1,4-cyclohexane dimethanol, p-xylene glycol, a polyethylene glycol, a polytetramethylene glycol, or a mixture thereof.

9. The copolyester of claim 1, wherein the glycol component is from about 30 to 70 mole % 2,2,4,4-tetramethyl-1,3-cyclobutanediol and from about 30 to 70 mole % ethylene glycol.

10. The copolyester of claim 1, wherein the glycol component comprises from about 50 to 70 mole % 2,2,4,4-tetramethyl-1,3-cyclobutanediol and from about 30 to 50 mole % ethylene glycol.

11. The copolyester of claim 1, wherein the glycol component is from about 50 to 70 mole % 2,2,4,4-tetramethyl-1,3-cyclobutanediol and from about 30 to 50 mole % ethylene glycol.

12. The copolyester of claim 1, wherein the diol of the glycol component is less than about 5 mole %.

13. The copolyester of claim 1, wherein the dicarboxylic acid component is 100 mole % terephthalic acid and the glycol component is from 35 to 70 mole % 2,2,4,4-tetramethyl-1,3-cyclobutanediol and from 30 to 65 mole % ethylene glycol.

14. The copolyester of claim 1, wherein the dicarboxylic acid component is 100 mole % terephthalic acid and the glycol component is from 50 to 70 mole % 2,2,4,4-tetramethyl-1,3-cyclobutanediol and from 30 to 50 mole % ethylene glycol.

15. The copolyester of claim 1, wherein the dicarboxylic acid component is 100 mole % terephthalic acid and the glycol component is from 64 to 69 mole % 2,2,4,4-tetramethyl-1,3-cyclobutanediol and from 31 to 36 mole % ethylene glycol.

16. The copolyester of claim 1, wherein the copolyester has a notched Izod impact strength of at least 1 ft-lb/inch (53.4 J/m).

17. The copolyester of claim 16, wherein the notched Izod impact strength is from about 1.5 to 12.5 ft-lb/inch (106.8 to 667.5 J/m).

18. The copolyester of claim 16, wherein the notched Izod impact strength is from about 2 to 12.5 ft-lb/inch (106.8 to 667.5 J/m).

19. The copolyester of claim 16, wherein the notched Izod impact strength is from about 11.4 to 12.5 ft-lb/inch (106.8 to 667.5 J/m).

20. The copolyester of claim 1, wherein the copolyester has a Rockwell L hardness of at least 70.

21. The copolyester of claim 1, wherein the copolyester has a Rockwell L hardness of at least 85.

22. The copolyester of claim 20, wherein the Rockwell L hardness is from 84 to 95.

23. The copolyester of claim 20, wherein the Rockwell L hardness is from 90 to 95.

24. The copolyester of claim 20, wherein the Rockwell L hardness is from 94 to 95.

25. The copolyester of claim 1, wherein the copolyester has a heat deflection temperature less than or equal to 108° C. at 264 psi (18.6 Kg-force/cm$^2$) loading.

26. The copolyester of claim 1, wherein the copolyester has a heat deflection temperature of from 80 to 108° C. at 264 psi (18.6 Kg-force/cm$^2$) loading.

27. The copolyester of claim 25, wherein the heat deflection temperature is from 90 to 108° C. at 264 psi (18.6 Kg-force/cm$^2$) loading.

28. The copolyester of claim 25, wherein the heat deflection temperature is from 102 to 108° C. at 264 psi (18.6 Kg-force/cm$^2$) loading.

29. The copolyester of claim 1, wherein the copolyester has a notched Izod impact strength of at least 1 ft-lb/inch (53.4 J/m); a Rockwell L hardness of at least 70; and a heat deflection temperature of at least 70° C. at 264 psi (18.6 Kg-force/cm$^2$) loading.

30. The copolyester of claim 1, wherein the copolyester has a notched Izod impact strength of from 1.5 to 12.5 ft-lb/inch (53.4 J/m); a Rockwell L hardness of from 84 to 95; and a heat deflection temperature of from 80 to 108° C. at 264 psi (18.6 Kg-force/cm$^2$) loading.

31. The copolyester of claim 1, wherein the copolyester has a notched Izod impact strength of from 2 to 12.5 ft-lb/inch (53.4 J/m); a Rockwell L hardness of from 90 to 95; and a heat deflection temperature of from 90 to 108° C. at 264 psi (18.6 Kg-force/cm$^2$) loading.

32. The copolyester of claim 1, wherein the copolyester has a notched Izod impact strength of from 11.4 to 12.5 ft-lb/inch (53.4 J/m); a Rockwell L hardness of from 90 to 95; and a heat deflection temperature of from 90 to 108° C. at 264 psi (18.6 Kg-force/cm$^2$) loading.

33. The copolyester of claim 1, wherein the copolyester has a notched Izod impact strength of from 11.4 to 12.5 ft-lb/inch (53.4 J/m); a Rockwell L hardness of from 94 to 95; and a heat deflection temperature of from 102 to 108° C. at 264 psi (18.6 Kg-force/cm$^2$) loading.

34. A process for producing a copolyester, comprising:
   (1) heating a mixture, comprising:
      (a) a dicarboxylic acid component, comprising:
         i) from about 80 to 100 mole % terephthalic acid or the ester thereof;
         ii) less than or equal to 20 mole % of an aromatic dicarboxylic acid having up to 20 carbon atoms or the ester thereof; and
         iii) less than or equal to 10 mole % of an aliphatic dicarboxylic acid or an ester thereof having up to 16 carbon atoms; and
      (b) a glycol component comprising:
         iv) from about 25 to 85 mole % 2,2,4,4-tetramethyl-1,3-cyclobutanediol;
         v) from about 15 to 75 mole % ethylene glycol; and
         vi) less than or equal to 10 mole % of a diol having 3 to 16 carbon atoms, wherein the total mole % of the dicarboxylic acid component is 100 mole % and the total mole % of the glycol component is 100 mole %,
in the presence of a catalyst at a temperature of about 150° C. to 220° C. for a time sufficient to produce an initial copolyester; and (2) further heating the initial polyester of step (1) at about 220 to 320° C. for about 1 to 2 hours.

35. The process of claim 34, further comprising, after step (2), removing any unreacted glycol component.

36. The process of claim 34, wherein the catalyst comprises an organic derivative of zinc or tin.

37. The product made by the process of claim 34.

38. The product made by the process of claim 35.

39. A polymer blend, comprising:
   i) from about 5 to 95 wt % of the copolyester according to claim 1; and
   ii) from 5 to 95 wt % of a component comprising a flame retardant, a filler, a reinforcing agent and a polymer.

40. The blend of claim 39, wherein the flame retardant comprises a phosphorus compound, a halogen compound, a halogen compound in combination with an antimony compound, or a mixture thereof.

41. The blend of claim 39, wherein the filler comprises talc, mica, or a mixture thereof.

42. The blend of claim 39, wherein the reinforcing agent comprises a glass fiber, a poly(1,4-phenylene terephthalate), a carbon fiber, or a mixture thereof.

43. The blend of claim 39, wherein the polymer comprises a polyester, a polycarbonate, a polyphenylene oxide, a poly(ether-imide), polyphenylene sulfides, and polysulfones, a poly(ester-carbonate), a polysulfone ether, a poly(ether-ketone), or a mixture thereof.

44. An article of manufacture comprising an article made from the copolyester of claim 1.

45. An article of manufacture comprising an article made from the blend of claim 39.

46. The article of claim 44, wherein the article is a molded article, a fiber, a film or a sheet.

47. The article of claim 45, wherein the article is a molded article, a fiber, a film or a sheet.

48. A copolyester comprising:
   (a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
   (b) a glycol component comprising about 25 to 85 mol % 2,2,4,4-tetramethyl-1,3-cyclobutanediol, about 15 to 75 mol % ethylene glycol, and about 0 to 10 mol % of other glycols having 3 to 16 carbon atoms,
   wherein the total mol % of the dicarboxylic acid component is 100 mol % and the total mol % of the glycol component is 100 mol %, further wherein the heat deflection temperature is at least 70° C. at 264 psi (18.6 Kg-force/cm$^2$) loading, determined according to ASTM D648.

49. A process for producing a copolyester comprising:
   (1) heating the following mixture in the presence of a catalyst at a temperature of about 150° C. to 220° C. for a time sufficient to react a significant portion of the distillable ethylene glycol,
      (a) a dicarboxylic acid component comprising about 80 to 100 mol % terephthalic acid or esters thereof, about 0 to 20 mol % other aromatic dicarboxylic acids having up to 20 carbon atoms or esters thereof, and not more than 10 mol % aliphatic dicarboxylic acids having up to 16 carbon atoms, and
      (b) a glycol component comprising about 25 to 85 mol % 2,2,4,4-tetramethyl-1,3-cyclobutanediol, about 15 to 75 mol % ethylene glycol, and about 0 to 10 mol % other glycols having 3 to 16 carbon atoms,
      wherein the total mol % of the dicarboxylic acid component is 100 mol % and the total mol % of the glycol component is 100 mol %; and
   (2) further heating the mixture of step (1) at about 220 to 320° C. for about 1 to 2 hours; and
   (3) thereafter, removing any unreacted glycols.

50. A copolyester consisting essentially of:
   (a) a dicarboxylic acid component, comprising:
      i) from about 80 to 100 mole % terephthalic acid or the ester thereof;
      ii) from about 0 to 20 mole % of an aromatic dicarboxylic acid having up to 20 carbon atoms or the ester thereof, and
      iii) less than or equal to 10 mole % of an aliphatic dicarboxylic acid or an ester thereof having up to 16 carbon atoms; and
   (b) a glycol component comprising:
      iv) from about 25 to 85 mole % 2,2,4,4-tetramethyl-1,3-cyclobutanediol;
      v) from about 15 to 75 mole % ethylene glycol; and
      vi) less than or equal to 100 mole % of a diol having 3 to 16 carbon atoms,
   wherein the total mole % of the dicarboxylic acid component is 100 mole % and the total mole % of the glycol component is 100 mole %.

51. A copolyester consisting essentially of:
   (a) a dicarboxylic acid component, comprising:
      i) from about 80 to 100 mole % terephthalic acid or the ester thereof,
      ii) from about 0 to 20 mole % of an aromatic dicarboxylic acid having up to 20 carbon atoms or the ester thereof; and
   (b) a glycol component comprising:
      iii) from about 25 to 85 mole % 2,2,4,4-tetramethyl-1,3-cyclobutanediol;
      iv) from about 15 to 75 mole % ethylene glycol; and
      v) less than or equal to 10 mole % of a diol having 3 to 16 carbon atoms,
   wherein the total mole % of the dicarboxylic acid component is 100 mole % and the total mole % of the glycol component is 100 mole %.

\* \* \* \* \*

UNITED STATES PATENT AND TRADEMARK OFFICE
CERTIFICATE OF CORRECTION

PATENT NO. : 5,955,565
DATED : September 21, 1999
INVENTOR(S) : John C. Morris et al It is certified that error appears in the above-identified patent and that said Letters Patent is hereby corrected as shown below:

Column 16, line 37, (in Claim 50) reads as follows:

"vi) less than or equal to 100 mole % of a diol having 3"

It should read as follows:

"vi) less than or equal to 10 mole % of a diol having 3"

Signed and Sealed this

Eighteenth Day of April, 2000

Attest:

Attesting Officer

Q. TODD DICKINSON

Director of Patents and Trademarks